US012182275B2

(12) United States Patent
Tomonaga et al.

(10) Patent No.: US 12,182,275 B2
(45) Date of Patent: Dec. 31, 2024

(54) STORAGE DATA DELETION MANAGEMENT SYSTEM AND APPARATUS

(71) Applicant: Kioxia Corporation, Tokyo (JP)

(72) Inventors: Kazusa Tomonaga, Cupertino, CA (US); Yoshihiro Ohba, Kanagawa (JP); Atsushi Kunimatsu, Chiba (JP)

(73) Assignee: KIOXIA CORPORATION, Tokyo (JP)

( * ) Notice: Subject to any disclaimer, the term of this patent is extended or adjusted under 35 U.S.C. 154(b) by 290 days.

(21) Appl. No.: 17/707,736

(22) Filed: Mar. 29, 2022

(65) Prior Publication Data

US 2023/0315865 A1 Oct. 5, 2023

(51) Int. Cl.
*G06F 21/60* (2013.01)
*G06Q 10/00* (2023.01)
*G06Q 10/30* (2023.01)

(52) U.S. Cl.
CPC .......... *G06F 21/60* (2013.01); *G06Q 10/30* (2013.01); *G06F 2221/2143* (2013.01); *G06Q 2220/00* (2013.01)

(58) Field of Classification Search
CPC . G06F 21/60; G06F 2221/2143; G06Q 10/30; G06Q 2220/00
See application file for complete search history.

(56) References Cited

U.S. PATENT DOCUMENTS

| 10,839,108 B2* | 11/2020 | Awan | H04L 9/3239 |
| 2016/0013945 A1* | 1/2016 | Offenberg | G06F 21/64 |
| | | | 713/176 |
| 2016/0335004 A1* | 11/2016 | Jones | G06F 12/1475 |
| 2021/0223968 A1* | 7/2021 | Umesawa | H04L 9/3263 |
| 2021/0365388 A1* | 11/2021 | Jo | H04L 9/06 |
| 2022/0075537 A1* | 3/2022 | Dover | G06F 3/0679 |
| 2022/0094557 A1* | 3/2022 | Fujishiro | H04L 9/3268 |

FOREIGN PATENT DOCUMENTS

CN 116893778 A * 10/2023 ............. G06F 21/60

OTHER PUBLICATIONS

Kissell et al. "Guidelines for Media Sanitization", National Institute of Standards and Technology, U.S. Department of Commerce, NIST Special Publication 800-88 Revision 1, Dec. 2014.

* cited by examiner

*Primary Examiner* — Kostas J Katsikis
(74) *Attorney, Agent, or Firm* — Foley & Lardner LLP

(57) ABSTRACT

A method of sanitizing a media comprising a controller and a storage device, the method comprising executing, by the controller, a command to erase a data area and an internal area of the storage device, verifying, by the controller, that at least a portion of the data area and at least a portion of the internal area of the storage device has been erased, generating, by the server, a certificate of media sanitization (CoS) of the media, and registering, by the server, an entry representative of the CoS of the media in a distributed ledger or database. Here the storage device is configured to store data received from a host external to the storage device only in the data area, and the storage device is configured to store operational data in the internal area for the operation of the storage device.

30 Claims, 7 Drawing Sheets

| 400 | |
|---|---|
| Manufacturer | |
| Model | |
| Serial Number | |
| Organizationally Assigned Media or Property Number | |
| Media Type (HDD, SSD, Hybrid, etc.) | |
| Media Source (i.e., user or computer) | |
| Pre-Sanitization Confidentiality Categorization | |
| Sanitization Description (Clear, Purge or Destroy) | |
| Method Used (i.e., degauss, overwrite, block erase, crypto erase, etc.) | |
| Tools used | |
| Sanitization – Date | Verification – Date |
| Sanitization – Name of Person | Verification – Name of Person |
| Sanitization – Position / Title of Person | Verification – Position / Title of Person |
| Sanitization – Location | Verification – Location |
| Sanitization – Phone or Other Contact Information | Verification – Phone or Other Contact Information |
| Sanitization – Signature | Verification – Signature |
| Date Backup Reference (optional) | |
| Total number of sanitizations (optional) | |
| Signature of CoS Issuer | |

FIG. 4

STORAGE DATA DELETION MANAGEMENT SYSTEM AND APPARATUS

FIELD

The present disclosure relates to methods, devices and systems for sanitizing a media that generates a certificate of media sanitization (CoS) which guarantees that the data of the storage device in the media has actually been deleted.

BACKGROUND

Over the last decade, the use of memory systems has become widespread. Such memory systems include media such as solid-state drives (SSDs) and hard disk drives (HDDs). SSDs are non-volatile media that include NAND flash memory devices. Such media generally have fast performance and are compact, and often include a controller to manage the data stored. Given these advantages, SSDs are being used as the main storage device in most computing devices and consumer products. Due to the increasing demand of memory systems, such media are often repurposed throughout their lifespan. Further, in keeping with the trend of circular economy and the industry's trends which are directed to reducing e-waste in digital storage and sustainability, data center equipment including storage devices will be required to be recyclable.

However data security has become an issue because internal areas of recycled media may still contain data from a previous use. To recycle storage devices, deleting user data securely is critical and important to avoid any data breach. In recent years, regulations for handling personal information such as General Data Protection Regulations (GDPRs) have been implemented to cater to such data leaks. The function of the GDPR is to guarantee that data, especially personal data, has been securely erased from the non-volatile memory in the memory system. The whole capacity of a storage device comprises data areas and internal areas. Data areas are configured to store data received from an external host. Internal areas are configured to store data that is used internally by the storage device and may contain data that is not received from an external host. Since the entire capacity of an SSD is invisible to a host, merely overwriting data in an SSD by the host is not enough as internal areas within the media may still contain data from a previous use, posing a data security issue.

Instead, the media has to be sanitized so that internal areas of within the media are also deleted. Deleting media data securely is a known technology and is standardized. Such standardized media sanitization processes have been described in "Guidelines for Media Sanitization" by the National Institute of Standards and Technology dated December 2014 (NIST SP 800-88 Revision 1, available online at http://dx.doi.org/10.6028/NIST.SP.800-88r1) which provides general guidelines for data deletion or media sanitization via methods such as clear, purge and destroy. However, even if a media has been sanitized and re-introduce into the supply chain, there is no guarantee that the media has been actually sanitized. Such information will be useful to a new user wishing to repurpose a recycled media. This imposes a challenge of using recycled media that has been re-introduced into the supply chain. Thus, it is desired to realize a new media sanitization methodology that increases reliability of recycled drives by providing a means to confirm that the media has been actually sanitized.

SUMMARY

According to an embodiment of the present disclosure, there is provided a method of sanitizing a media comprising a controller and a storage device, the method comprising executing, by the controller, a command to erase a data area and an internal area of the storage device, verifying, by the controller, that at least a portion of the data area and at least a portion of the internal area of the storage device has been erased, generating, by the server, a certificate of media sanitization (CoS) of the media, and registering, by the server, an entry representative of the CoS of the media in a distributed ledger or database. Here the storage device is configured to store data received from a host external to the storage device only in the data area, and the storage device is configured to store operational data in the internal area for the operation of the storage device.

In some implementations, the method further comprises executing, by the controller, an erase record command (ERC) to erase the whole capacity of the storage device. In certain implementations, the method further comprises encrypting, by a sanitization module within the controller, a hash value of the CoS using a private key unique to the media, to generate the entry representative of the CoS. In further implementations, the sanitization module comprises a processor running a Trusted Execution Environment (TEE). In other implementations, the verifying, generating and registering is performed atomically. In some implementations, the private key is stored in the controller.

In certain implementations, the method further comprises generating, by the controller, the entry in the distributed ledger calculated from the CoS and device identification information (DID) associated with the media. In further implementations, the method further comprises using, by the controller, a public key associated with the DID for verifying that the whole capacity of the media has been erased. In other implementations, the public key is stored in the server. In some implementations, the storage device comprises at least one of: a Non-Volatile Memory express (NVMe) storage device, a solid state drive (SSD), and a hard disk drive (HDD). In some implementations, the CoS comprises a data file that includes information relating to the media, information relating to the erasure of the media, and information relating to the verification of the erasure of the media. In certain implementations, the server is communicatively coupled to the media. In other implementations, the server is communicatively coupled to at least one node of a peer-to-peer network through which the distributed ledger operates. In further implementations, the peer-to-peer network comprises any one of: a block chain network, a cloud network or a cryptocurrency network.

According to another embodiment of the present disclosure, there is provided a media sanitization server comprising a processor in communication with a media comprising a controller and a storage device, the storage device having a data area and an internal area. The processor is configured to instruct the controller of the media to initiate a command to erase the data area and the internal area of the storage device of the media, and verify that at least a portion of the data area and at least a portion of the internal area of the storage device has been erased. The processor is configured to instruct the controller of the media to generate a certificate of media sanitization (CoS) of the media, and register an entry representative of the CoS of the media in a distributed ledger. Here the storage device is configured to store data received from a host external to the storage device only in the data area, and the storage device is configured to store operational data in the internal area for the operation of the storage device.

According to another embodiment of the present disclosure, there is provided a solid state drive (SSD) comprising a storage device comprising a data area and an internal area, the data area configured to store only data received from a host external to the storage device and the internal area configured to store operational data for the operation of the storage device. The SSD also comprises a controller communicatively coupled to the storage device, the controller configured to execute a command to erase the data area and the internal area of the storage device, verify that at least a portion of the data area and at least a portion of the internal area of the storage device has been erased, generate a certificate of media sanitization (CoS) of the media, and transmit the CoS to a media sanitization server an entry representative of the CoS for registration in a distributed ledger or database.

According to another embodiment of the present disclosure, there is provided a sanitization system comprising a plurality of sanitization servers, each coupled to a node of a plurality of nodes communicatively coupled together in a peer-to-peer network, and a plurality of media comprising a controller and a storage device, each controller in communication with a sanitization server of the plurality of sanitization servers. The sanitization server is configured to instruct a controller of a media that is in communication with the server to initiate a command to a erase data area and an internal area of the storage device, and verify that at least a portion of the data area and at least a portion of the internal area of the storage device has been erased. The sanitization server is also configured to generate a certificate of media sanitization (CoS) of the media, and register an entry representative of the CoS of the media in a distributed ledger that is in communication with the plurality of nodes of the peer-to-peer network. Here the storage device is configured to store data received from a host external to the storage device only in the data area, and the storage device is configured to store operational data in the internal area for the operation of the storage device.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which:

FIG. 4 illustrates an exemplary certificate of media sanitization (CoS) generated by a media after instruction by the media sanitization server of FIG. 2, according to one or more embodiments of the present disclosure;

DETAILED DESCRIPTION

To provide an overall understanding of the devices described herein, certain illustrative embodiments will be described. Although the embodiments and features described herein are specifically described for use in connection with memory systems such as SSDs, it will be understood that all the components and other features outlined below may be combined with one another in any suitable manner and may be adapted and applied to other types of reusable devices in which verification of sanitization of the device is required before the device can be recycled and repurposed.

Figure 1:
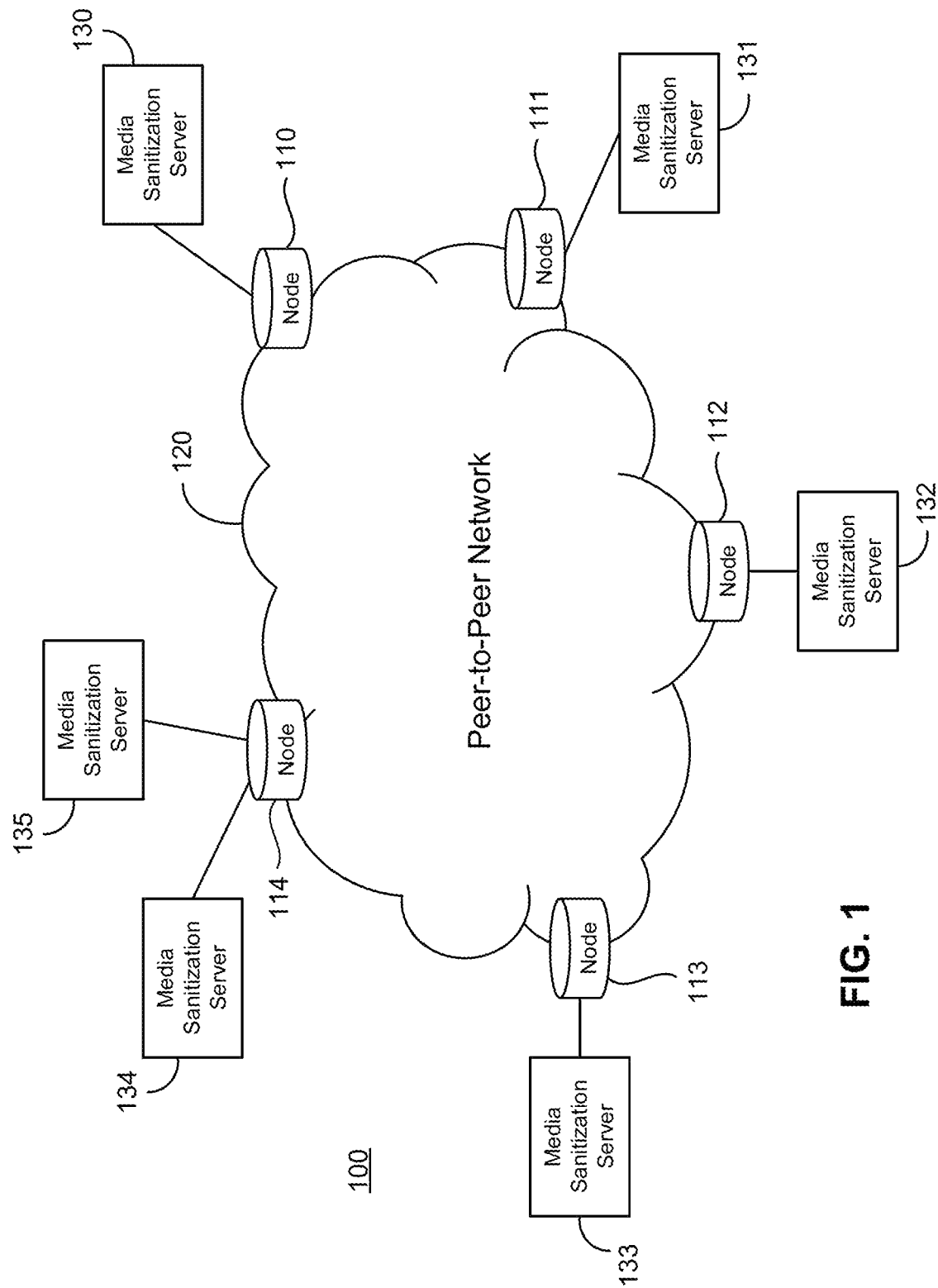
FIG. 1 is an exemplary schematic representation of a media sanitization network, configured according to one or more embodiments of the present disclosure.

FIG. 1 is a schematic representation of a media sanitization network 100 according to an embodiment of the present disclosure. Network 100 comprises a plurality of network nodes, such as network nodes 110-114, that are communicatively coupled to each other. Nodes 110-114 may comprise nodes of a peer-to-peer (P2P) network 120. In some embodiments, a blockchain or cryptocurrency protocol may operate on the P2P network 120. In other embodiments, the P2P network 120 may comprise a cryptocurrency. Each of nodes 110-114 are in communication with at least one media sanitization server 130-135. Media sanitization servers 130-135 may be in communication with the respective node 110-114 via a wired or wireless connection. Each media sanitization server 130-135 may comprise a processor configured to send and receive instructions to and from the node. In some embodiments, a ledger or database is maintained in a distributed manner by a set of nodes on the P2P network 120. Here, each blockchain node holds an instance of the distributed ledger and updates the instance by communicating with other blockchain nodes.

Figure 2:
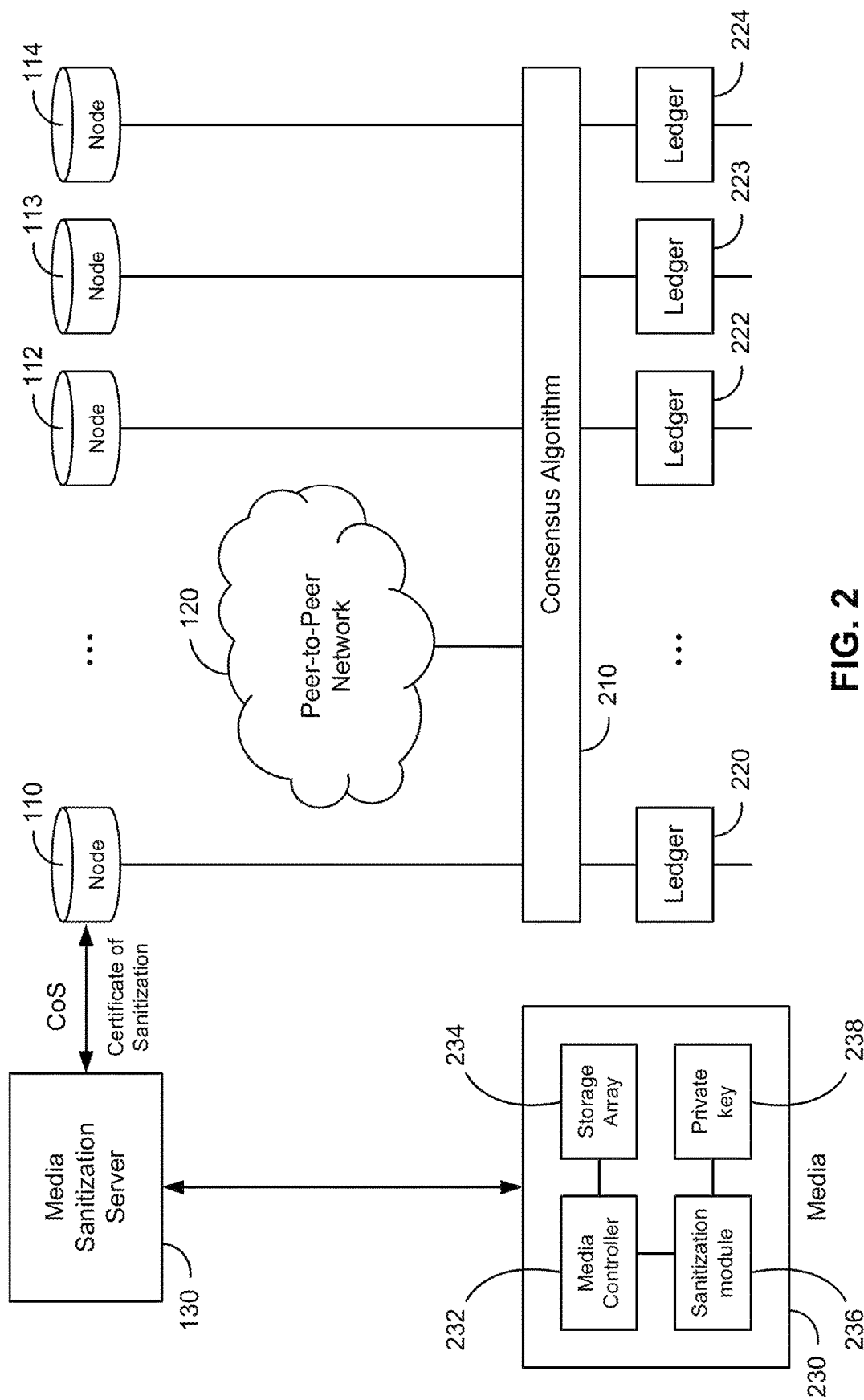
FIG. 2 is an exemplary schematic representation of a media sanitization server in communication with a media and a node of the network of FIG. 1, according to one or more embodiments of the present disclosure.

Each media sanitization server 130-135 may also be communicatively coupled to a media 230, as shown in FIG. 2. While FIG. 2 only shows media sanitization server 130 connected to media 230, it should be understood that the remaining media sanitization servers 131-135 in FIG. 1 may be communicatively coupled to a media similar to media 230 in FIG. 2. Media 230 may be in communication with the media sanitization server 130 via a wired or wireless connection. Further, while FIG. 2 shows only one media 230 coupled to media sanitization server 130, a plurality of media similar to media 230 may be communicatively coupled to each media sanitization server 130-135. Media 230 may comprise a solid-state drive (SSD), a hard disk drive (HDD), or any other media capable of storing data. Media 230 may also comprise a non-volatile SSD comprising a plurality of NAND flash memory arrays.

As shown in FIG. 2, media 230 comprises a media controller 232 coupled to a storage device 234. The storage device 234 comprises data areas and internal areas. Data areas are configured to store data received from an external host. Internal areas are configured to store data that is used internally by the storage device and not data that is received from an external host. The media controller 232 may also comprise internal areas to store data that is used internally by the controller 232. The media controller 232 may comprise a processor for executing instructions received from the media sanitization server 130, or any other internal instructions. The processor of the media controller 232 is configured to communicate with the processor of the media sanitization server 130 to which media 230 is coupled. Media 230 may also include a sanitization module 236 in communication with the media controller 232. While FIG. 2 depicts sanitization module 236 as separate from and connected to the media controller 232, it will be understood that the sanitization module 236 may be contained within the media controller 232. Further, the sanitization module 236 may be implemented as computer readable instructions to be executed by a processor within the media controller 232. In some implementations, the sanitization module 236 may comprise a Trusted Execution Environment (TEE) within the processor of the media controller 232. Media 230 may comprise a non-volatile SSD, where storage device 234 comprises a NAND flash memory array. In some implementations, media controller 232 may be an NVMe™ controller (NVMe™ is an acronym for "NVM express," where "NVM" stands for non-volatile memory, hereinafter NVMe).

Media 230 may have a unique device identifier (DID) and a private key 238 associated with the DID. The private key 238 may be stored as computer readable instructions or text data in the firmware of the media controller 232. The private key 238 may be used by the sanitization module 236 for the encryption of data sent by the media controller 232 to the media sanitization server 130.

In this manner, the private key creates an anti-tamper version of the data sent by the media controller 232. In some embodiments, the anti-tamper version is created by a one-way function such as a hash function using the private key 238. The private key 238 may also be used by the media controller 232 for the decryption of data received from the media sanitization server 130. Further, while FIG. 2 shows the media sanitization server 130 as separate from the media 230, in some implementations, the media sanitization server 130 may be contained within media 230.

FIG. 2 also shows the communication between the media sanitization server 130 and a node 110 of the P2P network 120. As previously mentioned, the P2P network 120 and nodes 110-114 make up a distributed network on which a blockchain or a cryptocurrency protocol may operate. Such protocols involve a consensus algorithm 210 executed on processors that behave like state machines. The consensus algorithm 210 of the P2P network 120 maintains the integrity of any messages sent between nodes 110-114 of the P2P network 120 across all the nodes in view of the unreliability of at least one of the processors across the network 120. The consensus algorithm 210 may comprise a Proof of Work or Proof of Space and Time algorithm, for example. To achieve this, the consensus algorithm 210 utilizes a distributed ledger comprising a plurality of ledgers 220-224. A distributed ledger is a type of distributed database spread across the plurality of ledgers 220-224. The P2P network 120 receives messages from the nodes 110-114 which are then stored in the ledgers 220-224 of the distributed ledger. In this manner, the original messages received from the nodes 110-114 cannot be tampered with and changed. This is beneficial in the case where the messages comprise certificates of sanitization as received from the media sanitization servers 110-114 as will be described in the following sections. In an alternative embodiment, any centralized database connected to the nodes 110-114 and the P2P network 120 may be used.

Figure 3:
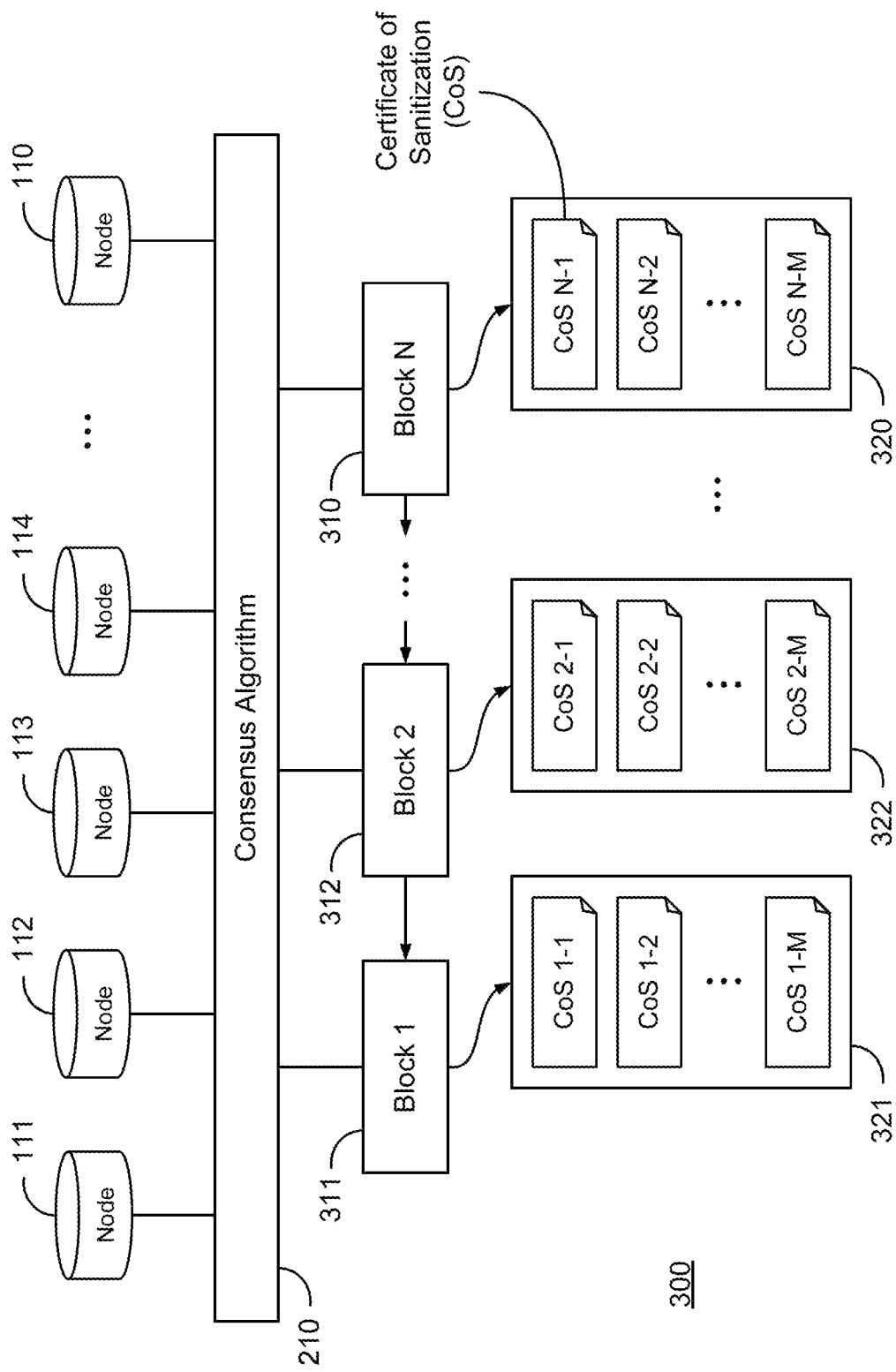
FIG. 3 illustrates an exemplary implementation of a blockchain network used as a distributed ledger for storing certificates of media sanitization provided by the media sanitization server of FIG. 2, according to one or more embodiments of the present disclosure.

FIG. 3 illustrates an exemplary distributed ledger 300 used in a P2P network 120 operating a blockchain protocol, for example. Distributed ledger 300 is similar to the distributed ledger comprising the plurality of ledgers 220-224 in FIG. 2. The distributed ledger 300 comprises a plurality of linked blocks 310-312 connected to ledgers 320-322. The ledgers 320-322 are similar to ledgers 220-224 in FIG. 2, and may comprise a blockchain database. Blocks 310-312 are in communication with the nodes 110-114 of the P2P network 120. When a node of the plurality of nodes 110-114 receives a message from a media sanitization server 130-135 connected to it, the consensus algorithm 210 running on the P2P network 120 directs that message to the ledgers 320-322 via the blocks 310-312. Blocks 310-312 are data structures within the ledgers 320-322 where messages or transaction data are permanently stored. Here each block 310-312 is digitally signed by a single node 110-114 that is selected by the consensus algorithm 210, after which the message and signature is stored in the ledger 320-322 associated with the block 310-312. Each blockchain node 110-114 may hold an instance of the distributed ledger and updates the instance by communicating with other blockchain nodes 110-114. The integrity of the multiple instances of the distributed ledger 320-322 is maintained by the consensus algorithm 210. The consensus algorithm 210 may comprise a Proof of Work or Proof of Space and Time algorithm, for example.

In some embodiments of the present disclosure, the message received from the media sanitization server 130 at the node 110-114 may comprise an encrypted CoS and DID of the media 230. An exemplary CoS 400 is shown in FIG. 4. The CoS 400 may contain bibliographic information relating to the media 230 that has been sanitized, such as serial number, media type, and method of media sanitization, for example. CoS 400 may also contain information relating to the execution of media sanitization and the verification of the sanitization results, such as date of sanitization, location of sanitization, and signature evidence of successful sanitization and verification, for example. Further, CoS 400 may contain a signature of the CoS issuer. The signatures in the CoS may be digitally issued by any one of the media controller 232, the media sanitization server 130 and the respective node 110-114. In some embodiments the CoS may comprise an encrypted text file.

Figure 5:
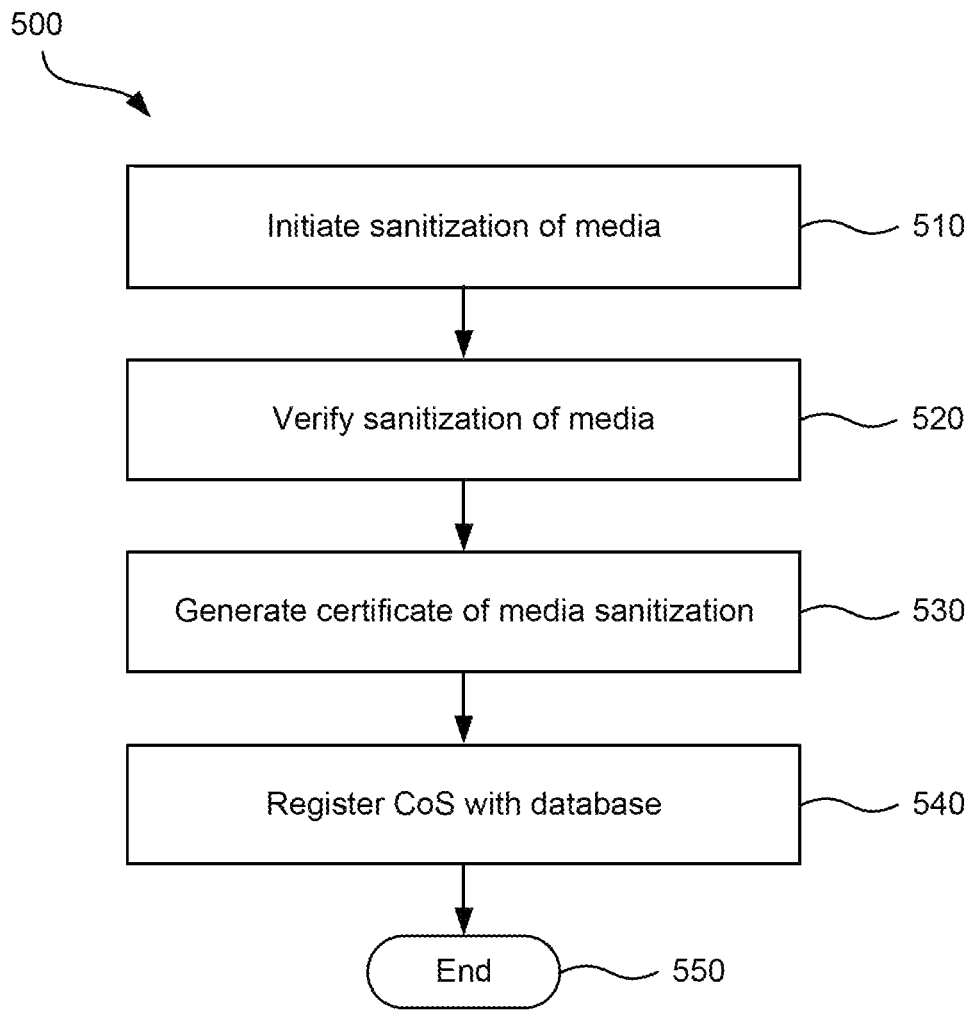
FIG. 5 illustrates an exemplary flow diagram of a method for sanitizing a media by the media sanitization server of FIG. 2, according to one or more embodiments of the present disclosure.

FIG. 5 shows an exemplary flow diagram of a method 500 for sanitizing a media 230 by the media sanitization server 130, as shown in FIG. 2, according to an embodiment of the present disclosure. The method 500 begins at step 510 where the media controller 232 initiates a sanitization command to erase a whole capacity of the storage device 234. Such an action may be initiated by a user of the media 230 wishing to erase the whole capacity of the storage device 234 for recycling, for example. Such a sanitization command would cause the erasure of data areas as well as internal working areas within the storage device 234. In some embodiments, the media sanitization server 130 may issue an instruction to the media controller 232 to execute a sanitization command. Additionally, media 230 may comprise a non-volatile SSD and the controller may comprise a NVMe controller. The NVMe controller may initiate the sanitization command using an Erase-Record Command (ERC), which is a standard NVMe command. The ERC will also obtain the identity information of the media, such as vendor name, vendor identification (ID), device model number, serial number, and controller ID, for example. Such identification information may be used in the CoS 400 as shown in FIG. 4. For other types of media, the sanitization of the storage device 234 may be achieved by any other commands specific to that media type that deletes the whole capacity of the memory array 234 including any internal areas with cryptographic erase or user data erase. Such commands include clear, purge or destroy, which may include processes such as degauss, overwrite, block erase and crypto erase, for example.

The method then proceeds to step 520 where the controller 232 verifies that the data in the storage device 234 is actually deleted, and that the media 230 has been sanitized successfully. Verification methodologies may include the execution of reading and checking operations for at least a portion of the storage device 234 or the entire capacity of the storage device 234. Other verification operations may also be used to verify that at least a portion of the storage device 234 or the entire capacity of the storage device 234 is cleared of data. Once the controller 232 has verified that the data in at least a portion of the storage device 234 or the entire capacity of the storage device 234 has been deleted, and thus the media 230 has been successfully sanitized, the media controller 232 generates a CoS (step 530). The CoS generated by the media controller 232 may comprise at least a portion of the information shown in FIG. 4. In some embodiments, the CoS may be generated by the media sanitization server 130. In some embodiments, the media sanitization server 130 may also save an erase log in the CoS to indicate the erasure of the various sections of the storage device 234 of the media 230.

The media controller 232 then proceeds to send a representation of the CoS to the media sanitization server 130 (step 540). In some embodiments, the representation of the CoS may comprise an encrypted version of the CoS. The encryption may involve an anti-tamper method that prevents alteration of the CoS where any attempt to alter the CoS can be easily identified. The encryption of the CoS is performed by the sanitization module 236 using the private key 238 after the CoS is generated by the media controller 232. Encryption and decryption of an electronic certificate using a private key and a public key have been described in U.S. Patent Application No. US2021/0223968 entitled "Memory system, information processing apparatus, and information processing system," published on Jul. 22, 2021, the contents of which are hereby incorporated herein in entirety. In this manner, the private key creates an anti-tamper version of the CoS generated by the media controller 232. In some embodiments, the anti-tamper version is created by a one-way function, such as a hash function, using the private key 238. The media controller 232 sends the encrypted CoS to the media sanitization server 130, along with media identity information, such as, for example, the DID. Upon receipt of the encrypted CoS and DID, the media sanitization server 130 registers the encrypted CoS and DID in the distributed ledger 220-224 via a node 110-114. In some embodiments, the distributed ledger 220-224 may be indexed with the media identity information, or any other information as shown in FIG. 4, to facilitate retrieval of the CoS at a later time. In some embodiments, the nodes 110-114 operate as blockchain nodes, as shown in FIG. 3, in which case the consensus algorithm 210 initiates a blockchain sequence for permanently storing the encrypted CoS into the blockchain database 320-322.

Figure 6:
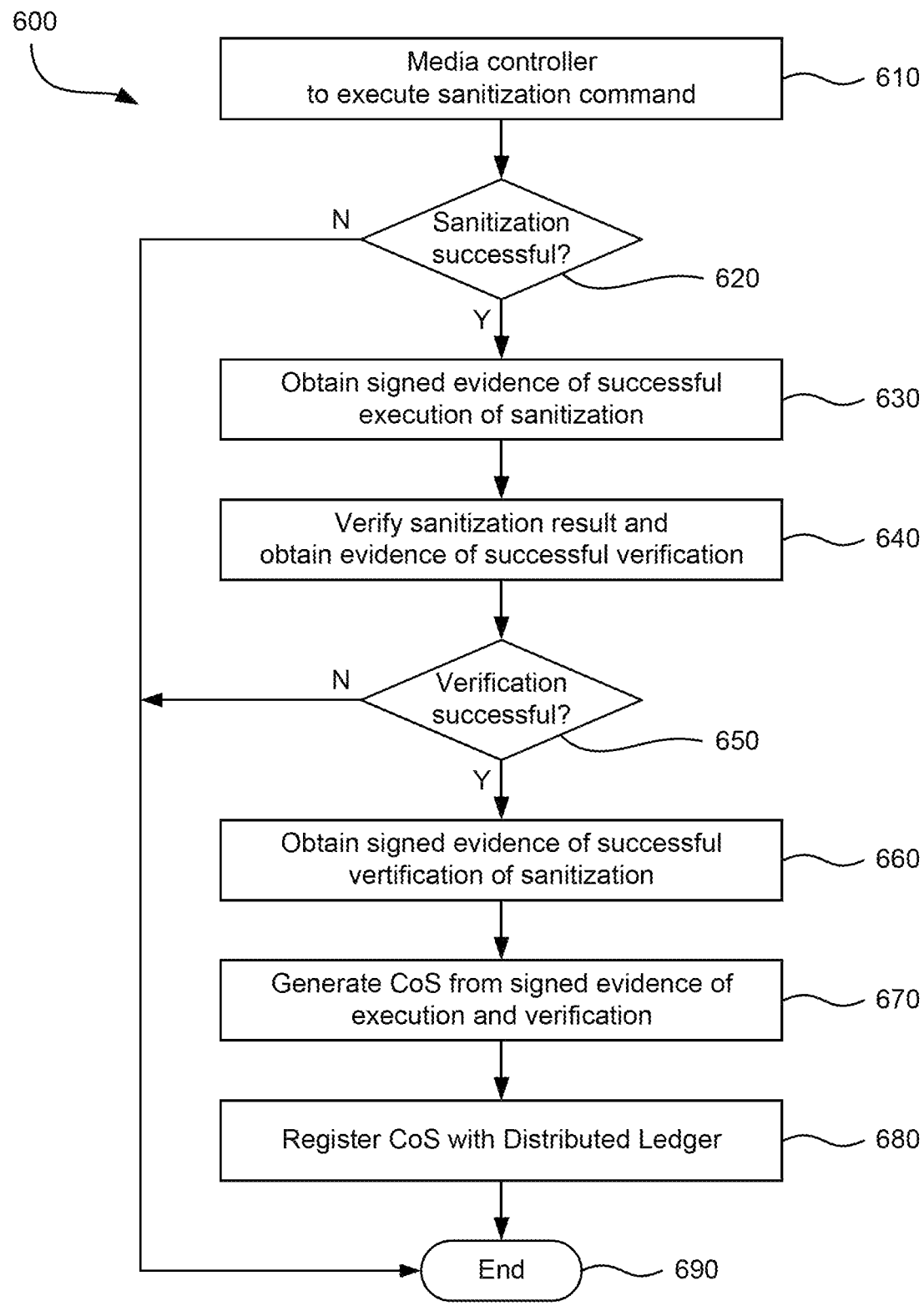
FIG. 6 illustrates an exemplary flow diagram of a method for sanitizing a media by the media sanitization server of FIGS. 1 and 2 with evidence and verification, according to one or more embodiments of the present disclosure.

FIG. 6 shows another exemplary flow diagram of a method 600 for sanitizing a media 230 by the media sanitization server 130 as shown in FIG. 2, according to an embodiment of the present disclosure. The method 600 is similar to the method 500 in FIG. 5, with additional steps for obtaining signed evidence of the sanitization and verification processes. The method begins at step 610 where the media controller 232 executes a sanitization command to erase a whole capacity of the storage device 234. Such an action may be initiated by a user of the media 230 wishing to erase the whole capacity of the storage device 234 for recycling, for example. Such a sanitization command would cause the erasure of data areas as well as internal working areas within the storage device 234. In some embodiments, the media sanitization server 130 may issue an instruction to the media controller 232 to execute a sanitization command. Additionally, media 230 may comprise a non-volatile SSD and the controller may comprise a NVMe controller. An NVMe controller may initiate the sanitization using an NVMe ERC. The ERC will also obtain the identity information of the media, such as vendor name, vendor identification (ID), device model number, serial number, and controller ID, for example. Such identification information may be used in the CoS 400 as shown in FIG. 4. For other types of media, the sanitization of the storage device 234 may be achieved by any other commands specific to that media type that deletes the whole capacity of the memory array 234 including any internal areas with cryptographic erase or user data erase. Such commands include clear, purge or destroy, which may include processes such as degauss, overwrite, block erase and crypto erase, for example.

The method then proceeds to step 620 where the controller 232 determines if the deletion of data from the storage device 234 was successful. The controller 232 determines this by checking the entire capacity of the storage device 234 for any data or personal information. If the erasure of data areas as well as internal working areas of the storage device 234 was successful ('Y' at step 620), the controller 232 proceeds to obtain signed evidence of successful execution of sanitization at step 630. Such signature evidence may be a digital signature of the person or entity initiating the ERC on the media 230. The signature evidence may be generated using the private key 238. The details of the sanitization may be stored in the CoS, as shown in FIG. 4. If the erasure of data areas as well as internal working areas of the storage device 234 was not successful ('N' at step 620), the method 600 of sanitizing the media 230 ends (step 690).

The controller 232 then utilizes the sanitization module 236 to verify that the data in the storage device 234 is actually deleted (step 640). Verification methodologies may include the execution of reading and checking operations for at least a portion of the storage device 234 or the entire capacity of the storage device 234. Other verification operations may also be used to verify that at least a portion of the storage device 234 or the entire capacity of the storage device 234 is cleared of data. Once the sanitization module 236 has verified that the data in at least a portion of the storage device 234 or the entire capacity of the storage device 234 has been deleted ('Y' at step 650), the sanitization module 236 utilizes the private key 238 to generate signed evidence of verification of sanitization at step 660. Such signature evidence may be a digital signature of the person or entity initiating the verification of sanitization of the media 230. As previously described, the private key 238 may be stored in the sanitization module 236 itself. In some embodiments, the sanitization module 236 may comprise a secure module such as a Trusted Execution Environment (TEE) module that is capable of verifying the result of sanitization of the storage device 234. The details of the verification of sanitization may be stored in the CoS, as shown in FIG. 4. If the verification fails ('N' at step 650), the method 600 ends (step 690). Further, in some embodiments, the signer of the evidence of successful sanitization at step 630 and the signer of the verification of sanitization at step 660 may be the same.

Once the sanitization module 236 has verified that the data in at least a portion of the storage device 234 or that the entire capacity of the storage device 234 has been deleted, and thus the media 230 has been successfully sanitized, the sanitization module 236 generates (step 670) a CoS from the signed evidence of successful execution of sanitization (obtained at step 630) and the signed evidence of verification of sanitization (obtained at step 660). The generated CoS is then signed by the sanitization module 236 as the issuer of the CoS. The CoS generated by the media controller 232 may comprise at least a portion of the information shown in FIG. 4. In some embodiments, the CoS is encrypted using the private key 238.

The encryption may involve an anti-tamper method that prevents alteration of the CoS and any attempt to alter the CoS will be easily identified. In this manner, the private key creates an anti-tamper version of the CoS generated by the media controller 232. In some embodiments, the anti-tamper version is created by a one-way function such as a hash function. In some embodiments the sanitization module 236 may be separate from the media 230, and so the signature of the CoS issuer may be different from the signed evidence of successful execution of sanitization (obtained at step 630) and the signed evidence of verification of sanitization (obtained at step 660). In some embodiments, the private key used to obtain the signed evidence of successful execution of sanitization (obtained at step 630) and the signed evidence of verification of sanitization (obtained at step 660) may be different from the private key used for encryption of the CoS generated at step 670.

The media controller 232 then proceeds to send the encrypted CoS to the media sanitization sever 130 (step 680) along with media identity information, such as, for example, the DID, for registration in the distributed ledger 220-224. Upon receipt of the encrypted CoS and DID, the media sanitization server 130 registers the encrypted CoS and DID in the distributed ledger 220-224 via a node 110-114. In some embodiments, the nodes 110-114 operate as blockchain nodes, as shown in FIG. 3, in which case the consensus algorithm 210 initiates a blockchain sequence for permanently storing the encrypted CoS into the blockchain database 320-322.

Figure 7:
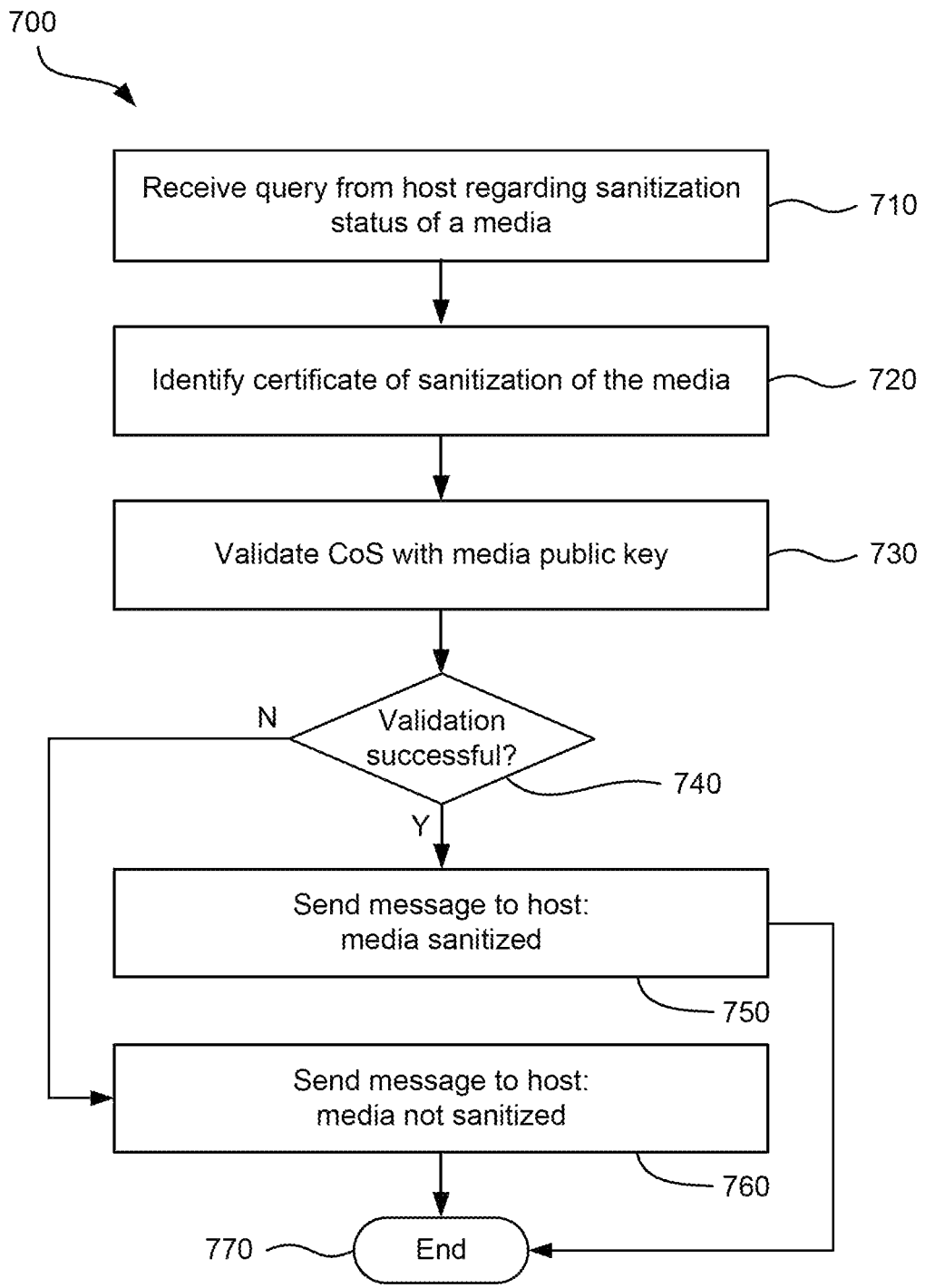
FIG. 7 illustrates an exemplary flow diagram of verifying a sanitization status of a media by the media sanitization server of FIG. 2, according to one or more embodiments of the present disclosure.

FIG. 7 illustrates a method 700 for verifying a sanitization status of a media 230 by the media sanitization server 130 of FIG. 2 upon request by a host, according to an embodiment of the present disclosure. As previously discussed, in accordance with the industry's trends, media such as SSDs and HDDs are being recycled for sustainability and to reduce waste. Thus when media is recycled, a host or other external entity may require verification of the sanitization status of the media before using the media. In such a situation, and in view of the system 200 in FIG. 2, the host may send a query to the media sanitization server 130 as shown in step 710 of method 700 to determine the sanitization status of a media 230. The host would also transmit a public key obtained from a media repository from which media 230 was obtained. The public key may be associated with the DID of the media 230, or any other device identifier as shown in FIG. 4.

Upon receipt from the host, the media sanitization server 130 uses the DID of the media 230 to index into the distributed ledger 220-224 via the nodes 110-114 of the P2P network 120 to identify the encrypted CoS associated with the media 230 (step 720). The P2P network 120 then sends the encrypted CoS to the media sanitization server 130. As previously described in relation to step 530 in FIG. 5 and step 670 in FIG. 6, the CoS's stored in the distributed ledger 220-224 are encrypted using a private key specific to the media 230. In contrast the public key may be tied to a group of media based on the manufacturer, model number, or any other group information. Upon receipt of the encrypted CoS, the media sanitization server 130 uses the public key to validate the CoS (step 730). Such validation may be performed by comparing a first hash value calculated from an erase log contained in the CoS with a second hash value generated by the decryption of a digital signature contained in the CoS using the public key. Validation of a CoS is described in U.S. Patent Application No. US2021/0223968 as identified above.

When the hash values obtained from the CoS match, i.e. the validation was successful ('Y' at step 740), the media sanitization server 130 sends a message to the host (step 750) confirming that the media 230 has been sanitized and no data is contained in the whole capacity of the memory array 234 including any internal areas, after which the method ends (step 770). However if the hash values obtained from the CoS do not match, i.e. the validation was not successful ('N' at step 740), the media sanitization server 130 sends a message to the host (step 760) informing the host that the media 230 has not been sanitized and that remnant data still remains in the memory array 234 and/or any internal areas, after which the method ends (step 770).

In the foregoing, all recitation of "module" or "layer" should be taken to mean a plurality of circuits within a controller or processor that facilitates the function as described. Such circuits may comprise electronic components formed on a semiconductor chip, such as, for example, transistors and resistors. Additionally, all recitation of "storage elements," "memory," and "storage device" are used interchangeably throughout the present disclosure.

Other objects, advantages and embodiments of the various aspects of the present invention will be apparent to those who are skilled in the field of the invention and are within the scope of the description and the accompanying figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method of sanitizing a media comprising a controller and a storage device in communication with a server, the method comprising:
   executing, by the controller, a command to erase a data area and an internal area of the storage device;
   verifying, by the controller, that at least a portion of the data area and at least a portion of the internal area of the storage device has been erased;
   generating, by the server, a certificate of media sanitization (CoS) of the media; and
   registering, by the server, an entry representative of the CoS of the media in a distributed ledger or database, wherein
   the storage device is configured to store data received from a host external to the storage device only in the data area, and
   the storage device is configured to store operational data in the internal area for the operation of the storage device, and further configured to not store data received from the host.

2. The method of claim 1, further comprising:
   executing, by the controller, an erase record command (ERC) to erase the whole capacity of the storage device.

3. The method of claim 1, further comprising:
encrypting, by a sanitization module within the controller, a hash value of the CoS using a private key unique to the media, to generate the entry representative of the CoS.

4. The method of claim 3, wherein the sanitization module comprises a processor running a Trusted Execution Environment (TEE).

5. The method of claim 3, wherein the verifying, generating and registering is performed atomically.

6. The method of claim 3, wherein the private key is stored in the controller.

7. The method of claim 1, further comprising:
generating, by the controller, the entry in the distributed ledger calculated from the CoS and device identification information (DID) associated with the media.

8. The method of claim 7, further comprising:
using, by the controller, a public key associated with the DID for verifying that the whole capacity of the media has been erased.

9. The method of claim 8, wherein the public key is stored in the server.

10. The method of claim 1, wherein the storage device comprises at least one of: a Non-Volatile Memory express (NVMe) storage device, a solid state drive (SSD), and a hard disk drive (HDD).

11. The method of claim 1, wherein the CoS comprises a data file that includes information relating to the media, information relating to the erasure of the media, and information relating to the verification of the erasure of the media.

12. The method of claim 1, the server is communicatively coupled to the media.

13. The method of claim 1, wherein the server is communicatively coupled to at least one node of a peer-to-peer network through which the distributed ledger operates.

14. The method of claim 13, wherein the peer-to-peer network comprises any one of: a block chain network, a cloud network or a cryptocurrency network.

15. A media sanitization server comprising:
a processor in communication with a media comprising a controller and a storage device, the storage device having a data area and an internal area, the processor configured to:
instruct the controller of the media to:
initiate a command to erase the data area and the internal area of the storage device of the media; and
verify that at least a portion of the data area and at least a portion of the internal area of the storage device has been erased;
generate a certificate of media sanitization (CoS) of the media, and
register an entry representative of the CoS of the media in a distributed ledger,
wherein
the storage device is configured to store data received from a host external to the storage device only in the data area, and
the storage device is configured to store operational data in the internal area for the operation of the storage device, and further configured to not store data received from the host.

16. The media sanitization server of claim 15, wherein the processor is configured to instruct the controller of the media to execute an erase record command (ERC) to erase the whole capacity of the storage device.

17. The media sanitization server of claim 15, wherein the controller comprises a sanitization module configured to encrypt a hash value of an erase log corresponding to the erasure of the whole capacity of the storage device, using a private key unique to the media, to generate the CoS.

18. The media sanitization server of claim 17, wherein the processor is configured to run a Trusted Execution Environment (TEE) for verifying that the whole capacity of the media has been erased.

19. The media sanitization server of claim 15, wherein the processor is configured to instruct the controller of the media to generate the entry in the distributed ledger calculated from the CoS and device identification information (DID) associated with the media.

20. A solid state drive (SSD) comprising:
a storage device comprising a data area and an internal area, the data area configured to store only data received from a host external to the storage device and the internal area configured to store operational data for the operation of the storage device, and the internal area is further configured to not store data received from the host; and
a controller communicatively coupled to the storage device, the controller configured to:
execute a command to erase the data area and the internal area of the storage device;
verify that at least a portion of the data area and at least a portion of the internal area of the storage device has been erased;
generate a certificate of media sanitization (CoS) of the media; and
transmit, to a media sanitization server, an entry representative of the CoS for registration in a distributed ledger or database.

21. The SSD of claim 20, wherein the controller is further configure to execute an erase record command (ERC) to erase the whole capacity of the storage device.

22. The SSD of claim 20, wherein the controller is further configure to encrypt a hash value of the CoS using a private key unique to the media, to generate the entry representative of the CoS.

23. The SSD of claim 22, wherein the controller comprises a processor running a Trusted Execution Environment (TEE).

24. The SSD of claim 22, wherein the private key is stored in the controller.

25. The SSD of claim 20, wherein the controller is further configure to generate the entry in the distributed ledger calculated from the CoS and device identification information (DID) associated with the media.

26. The SSD of claim 25, wherein the controller is further configure to use a public key associated with the DID for verifying that the whole capacity of the media has been erased.

27. The SSD of claim 20, wherein the storage device comprises at least one of: a Non-Volatile Memory express (NVMe) storage device, a solid state drive (SSD), and a hard disk drive (HDD).

28. The SSD of claim 20, wherein the CoS comprises a data file that includes information relating to the media, information relating to the erasure of the media, and information relating to the verification of the erasure of the media.

29. The SSD of claim 20, communicatively coupled to at least one of a media sanitization server and a node of a peer-to-peer network, wherein the peer-to-peer network comprises any one of: a block chain network, a cloud network or a cryptocurrency network.

30. A sanitization system comprising:
a plurality of sanitization servers, each coupled to a node of a plurality of nodes communicatively coupled together in a peer-to-peer network; and
a plurality of media comprising a controller and a storage device, each controller in communication with a sanitization server of the plurality of sanitization servers, wherein each sanitization server is configured to:
instruct a controller of a media that is in communication with the server to:
initiate a command to a erase data area and an internal area of the storage device; and
verify that at least a portion of the data area and at least a portion of the internal area of the storage device has been erased;
generate a certificate of media sanitization (CoS) of the media; and
register an entry representative of the CoS of the media in a distributed ledger that is in communication with the plurality of nodes of the peer-to-peer network,
wherein
the storage device is configured to store data received from a host external to the storage device only in the data area, and
the storage device is configured to store operational data in the internal area for the operation of the storage device, and further configured to not store data received from the host.

* * * * *